United States Patent
Song et al.

(10) Patent No.: US 12,458,587 B2
(45) Date of Patent: *Nov. 4, 2025

(54) **HYPOALLERGENIC COMPOSITION FOR SKIN REGENERATION OR SKIN SOOTHING, CONTAINING CULTURE PRODUCT OR EXTRACT OF *AUREOBASIDIUM PULLULANS* STRAIN**

(71) Applicant: AMOREPACIFIC CORPORATION, Seoul (KR)

(72) Inventors: Hohyun Song, Yongin-si (KR); Kilsun Myoung, Yongin-si (KR)

(73) Assignee: AMOREPACIFIC CORPORATION, Seoul (KR)

(*) Notice: Subject to any disclaimer, the term of this patent is extended or adjusted under 35 U.S.C. 154(b) by 1221 days.

This patent is subject to a terminal disclaimer.

(21) Appl. No.: 17/290,965

(22) PCT Filed: Nov. 7, 2019

(86) PCT No.: PCT/KR2019/015077
§ 371 (c)(1),
(2) Date: May 3, 2021

(87) PCT Pub. No.: WO2020/096379
PCT Pub. Date: May 14, 2020

(65) Prior Publication Data
US 2022/0040085 A1    Feb. 10, 2022

(30) Foreign Application Priority Data

Nov. 9, 2018 (KR) .................. 10-2018-0137527

(51) Int. Cl.
| A61K 8/99 | (2017.01) |
| A61Q 19/00 | (2006.01) |
| C12N 1/14 | (2006.01) |
| C12N 15/90 | (2006.01) |
| C12R 1/645 | (2006.01) |

(52) U.S. Cl.
CPC ............... *A61K 8/99* (2013.01); *A61Q 19/005* (2013.01); *C12N 1/145* (2021.05); *C12N 15/90* (2013.01); *A61K 2800/72* (2013.01); *C12R 2001/645* (2021.05)

(58) Field of Classification Search
CPC ...... A61K 8/99; A61K 2800/72; A61K 8/365; A61K 8/64; A61K 36/06; A61K 8/9728; A61Q 19/005; A61Q 19/00; C12N 1/145; C12N 15/90; C12R 2001/645

See application file for complete search history.

(56) References Cited

U.S. PATENT DOCUMENTS 11,504,409 B2 * 11/2022 Myoung ............... A61Q 19/08
2005/0272694 A1   12/2005 Moriya et al.
2009/0017123 A1   1/2009 Yamaguchi et al.
2010/0068184 A1   3/2010 Moriya et al.
2020/0038404 A1   2/2020 Rodgers et al.
2020/0384046 A1   12/2020 Myoung et al.

FOREIGN PATENT DOCUMENTS

| JP | 2013-053094 A1 | 3/2013 |
| JP | 2013053094 A * | 3/2013 |
| JP | 2013142058 A * | 7/2013 |
| KR | 10-2003-0097456 A | 12/2003 |
| KR | 10-2005-0093914 A | 9/2005 |
| KR | 10-2005-0115854 A | 12/2005 |
| KR | 10-2008-0010443 A | 1/2008 |
| KR | 10-2009-0080536 A | 7/2009 |
| KR | 10-2015-0028201 A1 | 3/2015 |
| KR | 10-2019-0058344 A1 | 5/2019 |

OTHER PUBLICATIONS

Richters, R et al. What is sensitive skin? A systematic literature review of objective measurements. Skin Pharmacology and Physiology. 2015. 28: 75-83. (Year: 2015).*
JP 2013053094A. Published Mar. 21, 2013. Machine Translation. (Year: 2013).*
Myoung, K et al. Ferment extract of Aureobasidium pullulans GJW induce migration of human keratinocytes. 2018 International Meeting of the Federation of Korean Microbiological Societies. Abstract D001. (Year: 2018).*
Tang, S et al. Dual effects of alpha-hydroxy acids on the skin. Molecules. 2018. Published Apr. 10, 2018. 28: 863. 12 pages. (Year: 2018).*
Simion, FA et al. Ability of moisturizers to reduce dry skin and irritation and to prevent their return. J. Cosmet. Sci. 2005. 56: 427-444. (Year: 2005).*
JP 2013142058 A. Published Jul. 22, 2013. Machine Translation. (Year: 2013).*
NCBI, GenBank accession No. KX349501.1, "Aureobasidium pullulans isolate F3-3-60 18S ribosomal RNA gene, partial sequence; internal transcribed spacer 1, 5.8S ribosomal RNA gene, and internal transcribed spacer 2, complete sequence; and 28S ribosomal RNA gene, partial sequence" (2016).
Park, Eun-Kyung et al., "A Study on the Variation of Skin Moisture, Oil(Sebum), Melanin and Erythema Index after Application of β-Glucan", Kor. J. Aesthet. Cosmetol. vol. 1, No. 3: 83-94 (2003).
International Search Report PCT/KR2019/015077, mailed Feb. 20, 2020.

(Continued)

*Primary Examiner* — David W Berke-Schlessel
*Assistant Examiner* — Susan E. Fernandez
(74) *Attorney, Agent, or Firm* — Merchant & Gould P.C.

(57) ABSTRACT

Disclosed in the present specification is a hypoallergenic composition for skin regeneration or skin soothing, containing, as an active ingredient, an *Aureobasidium pullulans* strain, a lysate thereof, a culture product thereof, or an extract of the strain, lysate or culture product. Unlike conventional functional ingredients, the composition is non-irritating to the skin, and thus is safe, while having a skin regeneration effect, and has a skin soothing effect by relieving irritation.

5 Claims, 3 Drawing Sheets

Specification includes a Sequence Listing.

(56) References Cited

OTHER PUBLICATIONS

Min-Soo Kim et al., "Optimization of β-1,3/1,6-Glucan Production of Aureobasidium pullulans KSY-0516 Strain", J Korean Soc Food Sci Nutr 46(12): 1568-1573 (2017) with English Abstract.
Office Action for Korean Application No. 10-2018-0137527 (Aug. 21, 2023).

\* cited by examiner

HYPOALLERGENIC COMPOSITION FOR SKIN REGENERATION OR SKIN SOOTHING, CONTAINING CULTURE PRODUCT OR EXTRACT OF *AUREOBASIDIUM PULLULANS* STRAIN

TECHNICAL FIELD

Disclosed in the present specification is a hypoallergenic composition for skin regeneration or skin soothing, which contains an *Aureobasidium pullulans* strain, a lysate thereof, a culture product thereof, or an extract of the strain, lysate or culture product as an active ingredient.

This application is a National Stage Application of PCT/KR2019/015077, filed Nov. 7, 2019, which claims benefit of priority to Korean Patent Application No. 10-2018-0137527 filed on Nov. 9, 2018, which applications are incorporated herein by reference. To the extent appropriate, a claim of priority is made to each of the above disclosed applications.

SEQUENCE STATEMENT

This application contains a Sequence Listing, which has been submitted electronically in ASCII format and is hereby incorporated by reference in its entirety. Said ASCII copy, created and filed in PCT/KR2019/015077, modified on May 3, 2021, is named Sequence_Listing.txt and is 1,741 bytes (1.70 KB) in size.

BACKGROUND ART

Recently, needs on naturally derived biofriendly raw materials are increasing as the use of chemical, insect-derived and animal-derived raw materials is avoided. Microbial resources are classified as renewable resources in that they can be reproduced unlike petroleum, water, etc. They are very useful for researches and industrial applications since the intrinsic characteristics of microorganisms that have adapted to various environments can be utilized.

In many products for external application to skin, ingredients unrelated with skin protection, e.g., surfactants, antiseptics, flavorants, pigments, etc., are used inevitably. These ingredients cause various side effects on sensitive skin. In addition, the functional ingredients such as α-hydroxy acids (AHAs), retinol, arbutin, etc. contained in functional products intended for skin whitening, wrinkle improvement, scrubbing, skin regeneration, etc. are the main cause of skin troubles because they are irritant to skin. Due to these side effects, it is difficult to use the products at the concentrations that provide the maximum effect. For example, although retinol and its derivatives are known to have superior skin-regenerating effect, caution is necessary for use on sensitive skin due to high potential of skin irritation. Therefore, the development of a material having skin irritation-relieving or skin-soothing effect, which can sufficiently exhibit its function without skin irritation is necessary.

REFERENCES OF RELATED ART

Patent Documents (Patent document 1) KR 10-2008-0010443 A.

DISCLOSURE

Technical Problem

In an aspect, the present specification is directed to providing a composition using microbial resources, which has skin-regenerating effect without skin irritation.

In another aspect, the present specification is directed to providing a composition using microbial resources, which has skin-soothing effect without skin irritation.

In another aspect, the present specification is directed to providing a strain having skin-regenerating and skin-soothing effect without skin irritation.

Technical Solution

In an aspect, the technology disclosed in the present specification provides a hypoallergenic composition for skin regeneration, which contains an *Aureobasidium pullulans* strain, a lysate thereof, a culture product thereof, an extract of the strain, an extract of the lysate or an extract of the culture product as an active ingredient.

In another aspect, the technology disclosed in the present specification provides a hypoallergenic composition for skin soothing, which contains an *Aureobasidium pullulans* strain, a lysate thereof, a culture product thereof, an extract of the strain, an extract of the lysate or an extract of the culture product as an active ingredient.

In an exemplary embodiment, the strain may be *Aureobasidium pullulans* GJW with the accession number KCCM12142P.

In an exemplary embodiment, the strain may have 18S rDNA represented by a sequence of SEQ ID NO: 1.

In an exemplary embodiment, the extract of the culture product may be an ethanol fraction of a culture fluid.

In an exemplary embodiment, the composition may promote skin wound healing or relieve scar formation.

In an exemplary embodiment, the composition may relieve skin irritation.

In an exemplary embodiment, the composition may relieve skin irritation by an α-hydroxy acid.

In an exemplary embodiment, the α-hydroxy acid may be one or more selected from a group consisting of lactic acid, malic acid, tartaric acid, citric acid and glycolic acid.

In an exemplary embodiment, the skin may be sensitive skin.

In an exemplary embodiment, the composition may be a cosmetic composition.

In another aspect, the technology disclosed in the present disclosure provides an *Aureobasidium pullulans* GJW strain with the accession number KCCM12142P.

In an exemplary embodiment, the strain may have hypoallergenic skin-regenerating effect.

In an exemplary embodiment, the strain may have hypoallergenic skin-soothing effect.

Advantageous Effects

In an aspect, the technology disclosed in the present specification has an effect of providing a composition using microbial resources, which has no skin irritation and has skin-regenerating effect.

In another aspect, the technology disclosed in the present specification has an effect of providing a composition using microbial resources, which has no skin irritation and has skin-soothing effect.

In another aspect, the technology disclosed in the present specification has an effect of providing a strain which has no skin irritation and has skin-regenerating and skin-soothing effect.

BEST MODE

Figure 1:
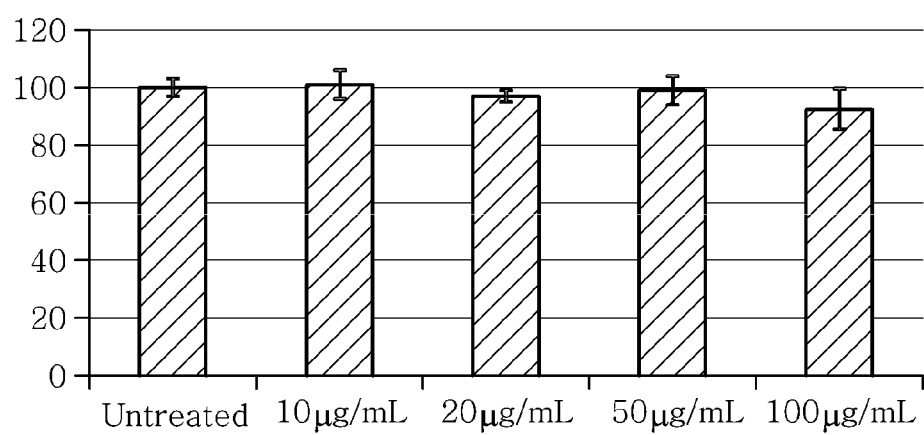
FIG. 1 shows a result of investigating the safety of an extract of a cultured fluid of *Aureobasidium pullulans* on skin cells in a test example of the present specification.

Hereinafter, the present disclosure is described in detail.

In an aspect, the technology disclosed in the present specification provides a hypoallergenic composition for skin regeneration, which contains an *Aureobasidium pullulans* strain, a lysate thereof, a culture product thereof, an extract of the strain, an extract of the lysate or an extract of the culture product as an active ingredient.

In another aspect, the technology disclosed in the present specification provides a method for hypoallergenic skin regeneration, which includes applying an amount effective for hypoallergenic skin regeneration of an *Aureobasidium pullulans* strain, a lysate thereof, a culture product thereof, an extract of the strain, an extract of the lysate or an extract of the culture product to a subject in need thereof.

In another aspect, the technology disclosed in the present specification provides an *Aureobasidium pullulans* strain, a lysate thereof, a culture product thereof, an extract of the strain, an extract of the lysate or an extract of the culture product for use in hypoallergenic skin regeneration.

In another aspect, the technology disclosed in the present specification provides a non-therapeutic use of an *Aureobasidium pullulans* strain, a lysate thereof, a culture product thereof, an extract of the strain, an extract of the lysate or an extract of the culture product for hypoallergenic skin regeneration.

In another aspect, the technology disclosed in the present specification provides a use of an *Aureobasidium pullulans* strain, a lysate thereof, a culture product thereof, an extract of the strain, an extract of the lysate or an extract of the culture product in manufacturing a hypoallergenic composition for skin regeneration.

In another aspect, the technology disclosed in the present specification provides a hypoallergenic composition for skin soothing, which contains an *Aureobasidium pullulans* strain, a lysate thereof, a culture product thereof, an extract of the strain, an extract of the lysate or an extract of the culture product as an active ingredient.

In another aspect, the technology disclosed in the present specification provides a method for hypoallergenic skin soothing, which includes applying an amount effective for hypoallergenic skin soothing of an *Aureobasidium pullulans* strain, a lysate thereof, a culture product thereof, an extract of the strain, an extract of the lysate or an extract of the culture product to a subject in need thereof.

In another aspect, the technology disclosed in the present specification provides an *Aureobasidium pullulans* strain, a lysate thereof, a culture product thereof, an extract of the strain, an extract of the lysate or an extract of the culture product for use in hypoallergenic skin soothing.

In another aspect, the technology disclosed in the present specification provides a non-therapeutic use of an *Aureobasidium pullulans* strain, a lysate thereof, a culture product thereof, an extract of the strain, an extract of the lysate or an extract of the culture product for hypoallergenic skin soothing.

In another aspect, the technology disclosed in the present specification provides a use of an *Aureobasidium pullulans* strain, a lysate thereof, a culture product thereof, an extract of the strain, an extract of the lysate or an extract of the culture product in manufacturing a hypoallergenic composition for skin soothing.

In an exemplary embodiment, the *Aureobasidium pullulans* strain, the lysate thereof, the culture product thereof, the extract of the strain, the extract of the lysate or the extract of the culture product may be used in the form of a pharmaceutical composition, a composition for external application to skin, a cosmetic composition or a food composition.

In an exemplary embodiment, the application may be administering or spreading to the subject.

Many functional ingredients contained in functional cosmetic products, e.g., ingredients having skin-regenerating effect, cause skin troubles due to high skin irritability. However, since the composition according to the present specification is not irritant to skin while having skin-regenerating and/or skin-soothing effect, it can be used for sensitive skin.

In the present specification, the "active ingredient" refers to an ingredient which exhibits activity on its own or exhibits the desired activity when used together with a carrier, etc. which exhibits no activity on its own.

*Aureobasidium pullulans*, which is commonly known as black yeast, is a microorganism found in soil or air. It has excellent environmental adaptability. It is known that *A. pullulans* can survive and grow even in harsh environments of low humidity, high temperature, intense solar radiation, and even radionuclides. *A. pullulans* protects itself from UV or organic free radicals by producing the melanin pigment like human skin and protects itself from external environments by producing 3-glucans such as pullulan (N. A. Yurlova et al. 2008. *Studies in Micrology* 61: 39-49).

In an exemplary embodiment, the strain may be *Aureobasidium pullulans* GJW with the accession number KCCM12142P.

In an exemplary embodiment, the strain may have 18S rDNA represented by a sequence of SEQ ID NO: 1.

[SEQ ID NO: 1]

[SEQ ID NO 1]
```
ggggactgcg gaggatcatt aagagtaagg gtgctcagcg cccgacctcc aaccctttgt tgttaaaact accttgttgc tttggcggga ccgctcggtc tcgagccgct ggggattcgt cccaggcgag cgcccgccag agttaaacca aactcttgtt attaaacggg tcgtctgagt taaaattttg aataaatcaa aactttcaac aacggatctc ttggttctcg catcgatgaa gaacgcagcg aaatgcgata agtaatgtga attgcagaat tcagtgaatc atcgaatctt tgaacgcaca ttgcgcccct tggtattccg aggggcatgc ctgttcgagc gtcattacac cactcaagct atgcttggta ttgggtgccg
```

```
                    -continued
        tccttagttg ggcgcgcctt aaagacctcg gcgaggcctc accggcttta ggcgtattag aatttattcg aacgtctgtc aaaggagagg acttctgccg actgaaacct tttatttttc taggttgacc tcggatcagg tagggatacc cgctgaactt aagcatatca ataaggcgga ggaa
```

In another aspect, the technology disclosed in the present specification provides an *Aureobasidium pullulans* GJW strain with the accession number KCCM12142P. The strain has 18S rDNA represented by a sequence of SEQ ID NO: 1.

In an exemplary embodiment, the strain may have hypoallergenic skin-regenerating effect.

In an exemplary embodiment, the strain may have hypoallergenic skin-soothing effect.

In an exemplary embodiment, the strain may be cultured, centrifuged, washed with sterilized physiological saline, suspended in a solvent, e.g., sterilized milk and prepared into a freeze-dried powder for use.

The lysate of the strain may refer to a product obtained by lysing the strain itself either chemically or by applying physical force.

The culture product of the strain may refer to some or all of the substances contained in a culture medium in which the strain was cultured, regardless the type of culture, e.g., solid culture, liquid culture, etc. For example, it may refer to a substance including a metabolite or a secreted product resulting from the culturing of the strain, or a lysate thereof, and the strain itself may also be included in the culture product. According to an exemplary embodiment of the present specification, the culture product may be obtained by culturing in a culture medium containing potato extract and dextrose.

The extract may refer to a product obtained by extracting the strain itself, a lysate of the strain, a culture product of the strain or a mixture thereof, regardless of extraction method, extraction solvent, extracted ingredients or type of the extract. The term is used in a broad concept, including any substance that can be obtained by further processing or treating after the extraction.

In an exemplary embodiment, the extract may be one extracted with an extraction solvent selected from a group consisting of water, an anhydrous or hydrated $C_{1-6}$ alcohol (e.g., methanol, ethanol, propanol or butanol), propylene glycol, butylene glycol, dipropylene glycol, glycerin, acetone, ethyl acetate, chloroform, methylene chloride, butyl acetate, diethyl ether, dichloromethane, hexane and a mixture thereof.

In an exemplary embodiment, the extract may be extracted with a solvent selected from water, an alcohol or a mixture thereof, specifically a $C_1$-$C_4$ lower alcohol or a mixture solvent thereof, more specifically an aqueous methanol or ethanol solution, although not being limited thereto.

In an exemplary embodiment, the extract may be an ethanol fraction.

In an exemplary embodiment, the extract of the culture product may be an ethanol fraction of a culture fluid.

In an exemplary embodiment, the *Aureobasidium pullulans* strain, the lysate thereof, the culture product thereof, the extract of the strain, the extract of the lysate or the extract of the culture product may be contained in an amount of 0.001-30 wt % based on the total weight of the composition. Specifically, it may be contained in an amount of 0.001 wt % or more, 0.01 wt % or more, 0.1 wt % or more, 0.5 wt % or more, 1 wt % or more, 1.5 wt % or more or 2 wt % or more, and 30 wt % or less, 25 wt % or less, 20 wt % or less, 15 wt % or less, 10 wt % or less or 5 wt % or less, based on the total weight of the composition.

In the present specification, the term hypoallergenic may mean that the composition or the *Aureobasidium pullulans* strain, the lysate thereof, the culture product thereof, the extract of the strain, the extract of the lysate or the extract of the culture product does not cause skin troubles such as skin dryness, erythema, rash, cornification, itchiness, burn, etc. when applied onto the skin of a person diagnosed with sensitive skin or causes slight irritations such that the person with sensitive skin does not feel uncomfortable.

In another aspect of the present specification, the term hypoallergenic may mean that the composition or the *Aureobasidium pullulans* strain, the lysate thereof, the culture product thereof, the extract of the strain, the extract of the lysate or the extract of the culture product has an irritation score of S score of lower than 6, lower than 5, lower than 4, lower than 3, lower than 2, lower than 1 or 0 when tested by end point assessment of the HET-CAM test.

In another aspect of the present specification, the term hypoallergenic may mean that the composition or the *Aureobasidium pullulans* strain, the lysate thereof, the culture product thereof, the extract of the strain, the extract of the lysate or the extract of the culture product has an irritation score of IS score of 5 or lower, 4 or lower, 3 or lower, 2 or lower, 1 or lower or 0 when tested by reaction time method of the HET-CAM test.

The HET-CAM test is an alternative to the Draize rabbit eye irritation test. It evaluates the degree of acute irritation of a test substance to a mucous membrane. It represents the degree of vascular response of the conjunctiva to the substance. The test is conducted by applying the test substance to the chorioallantoic membrane (CAM) of a fertilized and cultured egg. In general, fresh hatchery eggs with an intrinsic shape of well-known breeds (usually white horn) are used.

<1> Eye Calibration

The stimulation threshold according to the degree of stimulation is determined using Texapon Asv® (Cognis, sodium magnesium lauryl-myristyl-6-ethoxy-sulfate; anionic surfactant) as an internal standard substance (internal benchmark substance). 5% Texapon Asv® is classified as R36 by EU Directives (EC, 1991) with moderate irritation in the Draize rabbit eye test according to the OCED guideline No. 405.

[0.5%: weak hemorrhage and lysis]
[1.0%: moderate hemorrhage and lysis]
[5.0%: strong hemorrhage and lysis]

After applying each concentration to at least two hatchery eggs, response parameters are monitored with eyes and the criteria for judgment are maintained consistently. The categories of degree described are determined by the application period of 5 minutes and are used as standards for subjective evaluation in preliminary test.

<2> Preliminary Test

A preliminary test is carried out to determine whether the reaction time method or the end point assessment will be sufficient during a main test.

A test substance is dropped onto the prepared eggs.
Liquid volume: 300 µL (For solids, a quantity sufficient to cover at least about 25% of the membrane is dropped.)

After the test substance has been applied, the occurrence of hemorrhage, lysis, coagulation (intravascular and/or extravascular) of capillary vessels is checked.

For solid, creamy, colored or non-transparent test substances, after conducting reaction for 30 seconds, the test substance is rinsed off with physiological saline for 20 seconds and then observation is made by an operator for a predetermined time (e.g., 3 minutes). Then, the effects are evaluated according to Table 1.

TABLE 1

| Score | Effect |
|---|---|
| 0 | None |
| 1 | Weak |
| 2 | Moderate |
| 3 | Severe |

(** The main test should conform to the following criteria.)
(a) In order to perform the reaction time method, the assessment of the whole CAM must not be impeded by the test substance (The visibility of the whole CAM must be ensured).
(b) In the case of the end point assessment, it must be possible to remove the test substance from the membrane by rinsing the CAM with physiological saline.

After washing the test substance with physiological saline, evaluation is performed according to the criteria of Table 1 after observing for at least 30 seconds.

<2> Main Test

[Reaction Time Method]

Each test substance is applied to six hatchery eggs.

Three or more stopwatches are prepared.

If only hemorrhage and lysis have occurred in the preliminary test, two stopwatches are started as soon as 300 µL of the substance in a pipette is applied to the CAM.

While observing cautiously, the time when hemorrhage and lysis occur first is recorded in seconds.

For a substance that results in coagulation, one of the two stopwatches is stopped and the time of lysis is observed with the other stopwatch. Then, the time until coagulation occurs without stopping is measured.

An irritation index is calculated after recording is finished for the six hatchery eggs (see below for details).

On each day of the test, the eyes of the operator should be calibrated for each parameter using the laboratory internal reference substance, the anionic surfactant 5% Texapon Asv® (sodium magnesium lauryl-myristyl-6-ethoxy-sulfate) by performing the same method. This reference substance serves as a standard substance for evaluating the irritation index. The concentration of the substance used is assessed as being moderately irritating in the Draize eye irritation test.

TABLE 2

| Phenomenon | Description |
|---|---|
| Hemorrhage | Bleeding out from blood vessels (similar to snow crystals observed under microscope) |
| Lysis | Disappearance of small vessels on the CAM (result: hemorrhage, dystonia or disintegration of microvessels) |

TABLE 2-continued

| Phenomenon | Description |
|---|---|
| Coagulation | Intravascular (thrombosis) or extravascular of proteins (similar to egg protein turning opaque by heat; treatment with 3% trichloroacetic acid allows observation of distinct change in blood vessels) |

[End Point Assessment]

If a non-transparent substance hinders the observation of the CAM, an end point assessment is undertaken.

By analogy to the reaction time method, the test substance is tested on six prepared hatchery eggs.

After applying the substance, a stopwatch is started.

After 30 seconds, the CAM is carefully rinsed off with physiological saline for 20 seconds. Caution is necessary when rinsing off with physiological saline to avoid the tearing of the CAM.

If blood is mixed together during the treatment period, the reaction should be evaluated 30 seconds after the rinsing, since it is washed out during rinsing.

By analogy to the preliminary test, classify the degree of each response and follow the list (0=none, 1=weak, 2=moderate, 3=strong reaction).

<4> Calculation of Results

The score conversion table according to the reaction time method is shown in Table 3. The IS value is calculated by the equation 300 [IS]=5 [301−H]+7 [301−L]+9 [301−C] and has a value between 0 and 21 (H, L and C are the times when hemorrhage, lysis and coagulation are observed during the observation time up to 300 seconds, respectively).

TABLE 3

| [IS]score | Slightly irritating | Moderately irritating | Irritating | Severely irritating |
|---|---|---|---|---|
| IS ≤ 5.0 | ☉ | | | |
| 5.0 < IS ≤ 10.0 | | ☉ | | |
| 10.0 < IS ≤ 15.0 | | | ☉ | |
| 15 < IS < 21.0 | | | | ☉ |

In the end point assessment, the [S] score is represented as the sum of individual observed items. The score conversion table is shown in Table 4. For evaluation of the degree of irritation by a non-transparent substance, the reaction time method should be applied at the highest concentration by dissolving the test substance in water.

TABLE 4

| [S]score | Slightly irritating | Moderately irritating | Irritating | Severely irritating |
|---|---|---|---|---|
| S < 6 | ☉ | | | |
| 6 ≤ S ≤ 12 | | ☉ | | |
| 12 < S < 16 | | | ☉ | |
| S ≥ 16 | | | | ☉ |

In an exemplary embodiment, the composition or the *Aureobasidium pullulans* strain, the lysate thereof, the culture product thereof, the extract of the strain, the extract of the lysate or the extract of the culture product may promote skin wound healing or relieve scar formation.

In an exemplary embodiment, the composition or the *Aureobasidium pullulans* strain, the lysate thereof, the culture product thereof, the extract of the strain, the extract of the lysate or the extract of the culture product may alleviate skin irritation or skin troubles.

In an exemplary embodiment, the composition or the *Aureobasidium pullulans* strain, the lysate thereof, the culture product thereof, the extract of the strain, the extract of the lysate or the extract of the culture product may alleviate skin irritation by a product for external application to skin.

In an exemplary embodiment, the product for external application to skin may contain one or more of a surfactant, an antiseptic, a flavorant, a pigment and a functional ingredient, and the functional ingredient may have, for example, skin-whitening, wrinkle-improving, scrubbing or skin-regenerating effect.

In an exemplary embodiment, the composition or the *Aureobasidium pullulans* strain, the lysate thereof, the culture product thereof, the extract of the strain, the extract of the lysate or the extract of the culture product may alleviate skin irritation by an α-hydroxy acid.

In an exemplary embodiment, the α-hydroxy acid is a compound having an alcohol group or a hydroxy group at the α-carbon of a carboxylic acid, and may be one or more selected from a group consisting of lactic acid, malic acid, tartaric acid, citric acid and glycolic acid.

In an exemplary embodiment, the composition or the *Aureobasidium pullulans* strain, the lysate thereof, the culture product thereof, the extract of the strain, the extract of the lysate or the extract of the culture product may alleviate skin dryness, erythema, rash, cornification, itchiness, burn, etc. caused by skin irritation.

In an exemplary embodiment, the skin may be sensitive skin. The composition or the *Aureobasidium pullulans* strain, the lysate thereof, the culture product thereof, the extract of the strain, the extract of the lysate or the extract of the culture product according to the present disclosure has an effect of regenerating or soothing the damaged skin of a person with a skin sensitive to external stimulation without irritation.

According to an exemplary embodiment, the composition may be a pharmaceutical composition.

The pharmaceutical composition may further contain, in addition to the active ingredient, a pharmaceutical adjuvant such as an antiseptic, a stabilizer, a wetting agent, an emulsification accelerator, a salt and/or buffer for control of osmotic pressure, etc. or other therapeutically useful substances, and may be formulated into various formulations for oral administration or parenteral administration according to common methods.

The formulations for oral administration include, for example, a tablet, a pill, a hard or soft capsule, a liquid, a suspension, an emulsion, a syrup, a powder, a dust, a fine granule, a granule, a pellet, etc., and these formulations may further contain, in addition to the active ingredient, a surfactant, a diluent (e.g., lactose, dextrose, sucrose, mannitol, sorbitol, cellulose and glycine) or a glidant (e.g., silica, talc, stearic acid and its magnesium or calcium salt and polyethylene glycol). A tablet may further contain a binder such as magnesium aluminum silicate, starch paste, gelatin, tragacanth, methylcellulose, sodium carboxymethylcellulose and polyvinylpyrrolidone, and may further contain a pharmaceutical additive such as a disintegrant, e.g., starch, agar, alginic acid or its sodium salt, an absorbent, a colorant, a flavorant, a sweetener, etc. in some cases. The tablet may be prepared by a common mixing, granulation or coating method.

In addition, the formulation for parenteral administration may be a formulation for transdermal administration. Examples may include an injection, a medicinal drop, an ointment, a lotion, a gel, a cream, a spray, a suspension, an emulsion, a suppository, a patch, etc., although not being limited thereto.

The determination of the administration dosage of the active ingredient is within the level of those of ordinary skill. A daily administration dosage of the drug varies depending on various factors such as the progression of a condition to be treated, the time of onset, age, health condition, complications, etc. For adults, the composition may be typically administered at a dose of 1 μg/kg to 200 mg/kg, specifically 50 μg/kg to 50 mg/kg by a split-dose method of once to thrice a day, and the administration dosage is not intended to limit the scope of the present disclosure in any way.

According to an exemplary embodiment, the composition may be a composition for external application to skin. The composition for external application to skin collectively refers to any composition that may be applied externally to skin and may include medications of various formulations.

The composition for external application to skin may further contain, in addition to the active ingredient according to the present disclosure, a pharmaceutical adjuvant such as an antiseptic, a stabilizer, a wetting agent, an emulsification accelerator, a salt and/or buffer for control of osmotic pressure, etc. or other therapeutically useful substances, and may be formulated into various formulations for oral administration or parenteral administration according to common methods.

The formulation for parenteral administration may be a formulation for transdermal administration. Examples may include an injection, a medicinal drop, an ointment, a lotion, a gel, a cream, a spray, a suspension, an emulsion, a suppository, a patch, etc., although not being limited thereto.

In an exemplary embodiment, the composition for external application to skin may be a composition for topical application having a pharmaceutical use for skin regeneration or skin soothing.

According to an exemplary embodiment, the composition may be a cosmetic composition.

The cosmetic composition may further contain, in addition to the active ingredient according to the present disclosure, a functional additive and an ingredient commonly contained in general cosmetic compositions. The functional additive may include an ingredient selected from a group consisting of a water-soluble vitamin, an oil-soluble vitamin, a polypeptide, a polysaccharide, a sphingolipid and a seaweed extract. The additionally included ingredient may be an oil or fat, a humectant, an emollient, surfactant, an organic or inorganic pigment, an organic powder, a UV absorbent, an antiseptic, a sterilizer, an antioxidant, a plant extract, a pH-adjusting agent, an alcohol, a colorant, a flavorant, a blood circulation promoter, a cooling agent, an antiperspirant, purified water, etc.

The formulation of the cosmetic composition is not specially limited but may be selected adequately depending on purposes. For example, it may be prepared into one or more formulation selected from a group consisting of a skin lotion, a skin softener, a skin toner, an astringent, a lotion, a milk lotion, a moisturizing lotion, a nourishing lotion, a massage cream, a nourishing cream, a moisturizing cream, a hand cream, a foundation, an essence, a nourishing essence, a pack, a soap, a cleansing foam, a cleansing lotion, a cleansing cream, a body lotion and a body cleanser, although not being limited thereto.

In an exemplary embodiment, when the formulation of the present disclosure is a paste, a cream or a gel, animal fiber, plant fiber, wax, paraffin, starch, tragacanth, a cellulose derivative, polyethylene glycol, silicon, bentonite, silica, talc, zinc oxide, etc. may be used as a carrier ingredient.

In an exemplary embodiment, when the formulation of the present disclosure is a powder or a spray, lactose, talc, silica, aluminum hydroxide, calcium silicate or polyamide powder may be used as a carrier ingredient. In particular, a spray may further contain a propellant such as chlorofluorohydrocarbon, propane/butane or dimethyl ether.

In an exemplary embodiment, when the formulation of the present disclosure is a solution or an emulsion, a solvent, a solubilizer or an emulsifier may be used as a carrier ingredient. Examples include water, ethanol, isopropanol, ethyl carbonate, ethyl acetate, benzyl alcohol, benzyl benzoate, propylene glycol, 1,3-butylene glycol, glycerol aliphatic ester, polyethylene glycol or fatty acid ester of sorbitan.

In an exemplary embodiment, when the formulation of the present disclosure is a suspension, a liquid diluent such as water, ethanol or propylene glycol, a suspending agent such as ethoxylated isostearyl alcohol, polyoxyethylene sorbitol ester and polyoxyethylene sorbitan ester, microcrystalline cellulose, aluminum metahydroxide, bentonite, agar, tragacanth, etc. may be used as a carrier ingredient.

In an exemplary embodiment, when the formulation of the present disclosure is a surfactant-containing cleanser, aliphatic alcohol sulfate, aliphatic alcohol ether sulfate, sulfosuccinic acid monoester, isethionate, an imidazolinium derivative, methyl taurate, sarcosinate, fatty acid amide ether sulfate, alkyl amidobeaine, aliphatic alcohol, fatty acid glyceride, fatty acid diethanolamide, vegetable oil, a lanolin derivative, ethoxylated glycerol fatty acid ester, etc. may be used as a carrier ingredient.

In an exemplary embodiment, the cosmetic composition may be a cosmetic composition for application to skin, which contains 0.001-0.1 wt % of the *Aureobasidium pullulans* strain, the lysate thereof, the culture product thereof, the extract of the strain, the extract of the lysate or the extract of the culture product, 5-12 wt % of a polyol including propanediol, butylene glycol and glycerin, 0.01-1 wt % of a solubilizer including PEG-13-decyltetradeceth-24 and PEG-60 hydrogenated castor oil, 0.3-1 wt % of a thickener including a hydroxyethyl acrylate/sodium acryloyldimethyl taurate copolymer and an acrylate/$C_{10\text{-}30}$ alkyl acrylate crosspolymer, and water as the balance.

In an exemplary embodiment, the cosmetic composition may be a cosmetic composition in the form of a mask, which contains 0.001-0.1 wt % of the *Aureobasidium pullulans* strain, the lysate thereof, the culture product thereof, the extract of the strain, the extract of the lysate or the extract of the culture product, 15-20 wt % of an oil including cetyl ethyl hexanoate, hydrogenated poly($C_{6\text{-}14}$ olefin) and squalane, 1-2 wt % of a surfactant including polyglyceryl-3 methylglucose distearate and polyglyceryl-10 stearate, 5-12 wt % of a polyol including propanediol, butylene glycol and glycerin, 0.3-1 wt % of a thickener including a hydroxyethyl acrylate/sodium acryloyldimethyl taurate copolymer, and water as the balance.

According to an exemplary embodiment, the composition may be a food composition.

The food composition may be a formulation in liquid or solid form. Examples include various foods, beverages, gum, tea, vitamin complexes, health supplements, etc. and may be used in the form of a powder, a granule, a tablet, a capsule or a beverage. Ingredients commonly used in the related art may be selected and blended in the food composition of each formulation in addition to the active ingredient by those skilled in the art without difficulty depending on the particular formulation or the purpose of use, and a synergistic effect may be obtained when the active ingredient is used together with the additional ingredients.

There is no particular limitation on the liquid ingredient that may be contained in the food composition of the present disclosure in addition to the active ingredient. Various flavorants, natural carbohydrates, etc. may be added as additional ingredients as in ordinary beverages. Examples of the natural carbohydrate may include common sugars including monosaccharides such as glucose, etc., saccharides such as fructose, maltose, sucrose, etc., polysaccharides such as dextrin, cyclodextrin, etc. and sugar alcohols such as xylitol, sorbitol, erythritol, etc. As the flavorant, a natural flavorant or synthetic flavorant (e.g., saccharin, aspartame, etc.) may be used advantageously. The content of the natural carbohydrate may be generally about 1-20 g, specifically about 5-12 g, per 100 mL of the composition of the present disclosure.

In an aspect, the food composition may contain various nutrients, vitamins, minerals (electrolytes), flavors such as synthetic flavors and natural flavors, colorants, extenders (cheese, chocolate, etc.), pectic acid and its salts, alginic acid and its salts, organic acids, protective colloidal thickeners, pH-adjusting agents, stabilizers, antiseptics, glycerin, alcohols, carbonating agents used in carbonated beverages, etc. In another aspect, it may contain a pulp for preparing natural fruit juices of vegetable beverages. The ingredients may be used either independently or in combination. The content of the additives may vary, but it is generally selected in a range from 0.001 to 20 parts by weight per 100 parts by weight of the composition disclosed in the present disclosure.

MODE FOR INVENTION

Hereinafter, the present disclosure will be described in more detail through examples. These examples are for illustrative purposes only and it will be obvious to those having ordinary knowledge in the related art that the scope of the present disclosure is not limited by the examples.

Example 1. Isolation and Identification of Strain

An *Aureobasidium pullulans* strain used in this example was isolated from *Lemmaphyllum microphyllum* C. Presl in Gotjawal of Jeju Island as follows.

First, the harvested *Lemmaphyllum microphyllum* C. Presl was washed once with sterilized distilled water to remove impurities, immersed in phosphate-buffered saline (PBS) corresponding to 10 times based on weight, and then incubated at a speed of 250 rpm for 1 hour. Then, after diluting the PBS solution 10-fold and 100-fold with physiological saline, it was inoculated to PDA (4 g/L potato extract, 20 g/L dextrose, 15 g/L agar). Then, the inoculated medium was incubated at 25-30° C. for 2-7 days, and a single strain was isolated finally by subculturing the strain that formed a colony for 2-4 passages.

The isolated strain was identified through 18S rRNA base sequencing using an ITS1 primer and an ITS4 primer described in Table 5 below. As a result of Gene Bank search of the sequenced base sequence, the isolated strain was confirmed to have 94% similarity to the 18S rRNA base sequence of *Aureobasidium pullulans* F3-3-60 and was named as *Aureobasidium pullulans* GJW. The strain was deposited on Oct. 31, 2017 in the Korean Culture Center of Microorganisms and was given the accession number KCCM12142P.

TABLE 5

| SEQ ID NO: 2 | ITS1 | 5'-TCC GTA GGT GAA CCT GCG G-3' |
|---|---|---|
| SEQ ID NO: 3 | ITS4 | 5'-TCC TCC GCT TAT TGA TAT GC-3' |

Example 2. Preparation of Culture Fluid and Extract of *Aureobasidium pullulans* GJW The *Aureobasidium pullulans* GJW strain identified in Example 1 was inoculated to a culture medium (4 g/L potato extract, 20 g/L dextrose) and a culture fluid was obtained by culturing at 30° C. and 120 rpm for 5 days.

The obtained culture fluid of the *Aureobasidium pullulans* (*A. pullulans*) GJW strain was added to ethanol of the same volume and an ethanol fraction of the culture fluid was obtained by conducting reaction and remaining stationarily at 4° C. for 1 day. Then, an extract of the culture fluid was obtained by conducting centrifugation and freeze-drying.

Comparative Example 1. Preparation of General Yeast Extract

After inoculating a general yeast (*Saccharomyces cerevisiae* KCTC7296) strain to a culture medium (20 g/L peptone, 20 g/L dextrose, 10 g/20 L yeast extract), a culture fluid was obtained by culturing at 30° C. and 120 rpm for 1 day.

The culture fluid of the general yeast was added to ethanol of the same volume and an ethanol fraction was obtained by conducting reaction and remaining stationarily at 4° C. for 1 day. Then, an extract of the culture fluid was obtained by conducting centrifugation and freeze-drying.

Test Example 1. Confirmation of Safety for Skin Cells

Experiment was conducted as follows to confirm whether the extract of the culture fluid of the *Aureobasidium pullulans* strain obtained in Example 2 is safe for skin cells.

After dissolving the extract of the culture fluid of the *Aureobasidium pullulans* strain obtained in Example 2 in purified water (DW) and treating keratinocytes (HaCaT) with the extract, the effect on the activity of the cells was investigated. Specifically, after seeding 100 μL of the skin cells onto a 96-well cell culture plate at a concentration of $2 \times 10^5$ cells/mL and culturing for 24 hours, followed by treating with the extract of the culture fluid of the *Aureobasidium pullulans* strain at concentrations of 10 μg/mL, 20 μg/mL, 50 μg/mL and 100 μg/mL, respectively, the cells were cultured further for 24 hours. The experiment was repeated 3 times for the respective concentrations. The cell activity was compared by MTT assay and was represented relative to the activity of the untreated group as 100%.

As a result, the extract of the culture fluid of the *Aureobasidium pullulans* strain was confirmed to be safe for the skin cells since they had no effect on the growth of the skin cells (see FIG. 1).

Test Example 2. Confirmation of Skin Irritation

Experiment was conducted as follows to confirm whether the extract of the culture fluid of the *Aureobasidium pullulans* strain obtained in Example 2 irritates skin.

The skin irritation was confirmed by the HET-CAM (the hen's egg test-chorioallantoic membrane) test. The HET-CAM test is used as an alternative pre-screening test of eye irritation for animals and humans. Specifically, fertilized eggs were incubated in an automatic incubator at 37.5±0.5° C. and 55±7% humidity for 9 days. On day 10, only the fertilized eggs with well-developed CAM were selected using an egg tester. After preparing the sample to be tested by diluting in a vehicle at the same concentration and applying onto the chorioallantoic membrane of a fertilized egg that had been incubated for 10 days and conducting reaction for 30 seconds, the CAM was washed cautiously with sterilized physiological saline at 37° C. After 30 seconds, the irritation score was measured by evaluating the hemorrhage, lysis and coagulation of blood vessels. The end point assessment of the HET-CAM test was used and the experiment was repeated 3 times. The S score measured by evaluating the vascular responses (hemorrhage, lysis and coagulation) of the chorioallantoic membrane is given in Table 6. The score conversion table of the S score is shown in Table 4 above.

As shown in Table 6, it was confirmed that the extract of the culture fluid of the *Aureobasidium pullulans* strain exhibited no irritation with the S score of 0. In contrast, the general yeast (*Saccharomyces cerevisiae* KCTC7296) extract was moderately irritating with the S score of 7. Therefore, it was confirmed that the extract of the culture fluid of the *Aureobasidium pullulans* strain is significantly hypoallergenic as compared to the general yeast extract.

TABLE 6

|  | *A. pullulans* extract | General yeast extract |
|---|---|---|
| [S] score | 0 | 7 |

Test Example 3. Confirmation of Skin-Regenerating Effect

Experiment was conducted as follows in order to investigate whether the extract of the culture fluid of the *Aureobasidium pullulans* strain obtained in Example 2 has skin-regenerating effect.

A linear scratch wound was made on a monolayer of keratinocytes (HaCaT). The HaCaT cells were cultured using Dulbecco's modified Eagle's medium (DMEM, Lonza, USA) containing 10% fetal bovine serum (FBS, GIBCO, USA) in a 5% $CO_2$ incubator at 37° C. Immediately after the application of a scratch, the medium was replaced with a fresh medium containing the sample to be tested and the effect of the test sample on skin regeneration was investigated. The regeneration of the cells on the scratched area was imaged with a time-lapse microscope for 36 hours with 30-minute intervals and wound healing area (%) was compared relative the scratched area (as 100%) (n=4 per group).

Figure 2:
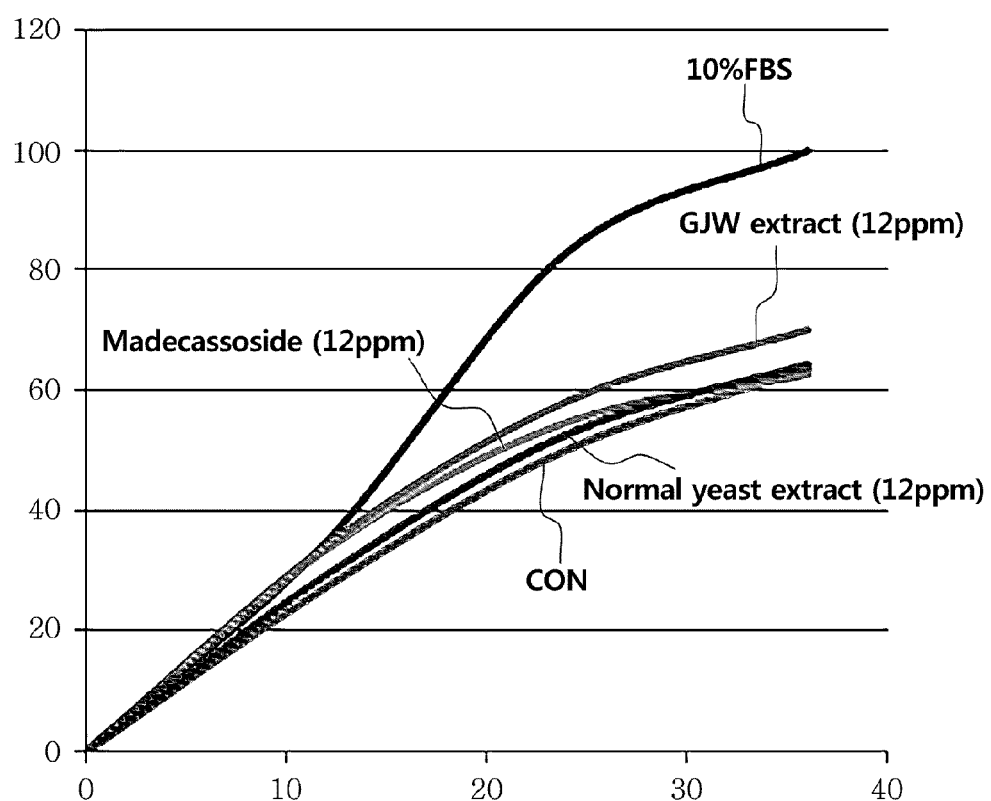
FIG. 2 shows a result of investigating the skin-regenerating effect of an extract of a cultured fluid of *Aureobasidium pullulans* in a test example of the present specification. In the graph, the x-axis represents time and the y-axis represents wound healing area (%).

As a result, the extract of the culture fluid of the *Aureobasidium pullulans* strain showed significant cell-regenerating effect at 12 hours, 24 hours and 36 hours as compared to an untreated group (CON). It exhibited significantly higher regenerating effect than made cassoside which is well known to have excellent regenerating effect. In contrast, the general yeast extract (*Saccharomyces cerevisiae* KCTC7296) did not show significant cell-regenerating effect at 12 hours, 24 hours and 36 hours as compared to the untreated group (CON) (see FIG. 2 and Table 7). Whereas the extract of the culture fluid of the *Aureobasidium pullulans* strain exhibited a wound healing area of about 10.3% larger than that of the untreated group (CON) at 36 hours after the scratching, the general yeast extract showed a wound healing area of only about 1.3% larger than that of the untreated group (CON). Therefore, it was confirmed that the extract of the culture fluid of the *Aureobasidium pullulans* strain has superior regenerating effect unlike the general yeast extract.

TABLE 7

| Test substance | Wound healing area (%) | | | |
|---|---|---|---|---|
| | Immediately after scratching | 12 hours later | 24 hours later | 36 hours later |
| CON (control) | 0 | 27.36 | 49.99 | 63.39 |
| 10% FBS (positive control) | 0 | 34.92 | 83.03 | 99.88 |
| Madecassoside (12 ppm) | 0 | 33.56 | 54.56 | 62.48 |
| GJW extract (12 ppm) | 0 | 34.22 | 58.09 | 69.93 |
| General yeast extract (12 ppm) | 0 | 29.33 | 52.55 | 64.23 |

Test Example 4. Confirmation of Skin-Soothing Effect

Experiment was conducted as follows in order to investigate whether the extract of the culture fluid of the *Aureobasidium pullulans* strain obtained in Example 2 has skin-soothing effect.

After culturing an adequate amount of human keratinocytes (HaCaT) on a 96-well cell culture plate and removing the medium, the cells were washed with phosphate-buffered saline (PBS) and the medium was replaced with one containing 0.1% lactic acid. At this time, the cells were treated with the extract of the culture fluid of the *Aureobasidium pullulans* strain obtained in Example 2 at different concentrations and cultured additionally for 24 hours. The skin-soothing effect in response to stimulation was evaluated by measuring the concentration of interleukin 1α (IL-1α) secreted to the cell culture using an enzyme-linked immunosorbent assay (ELISA) kit (ThermoFisher #BMS-243-2) (n=4 per group).

Figure 3:
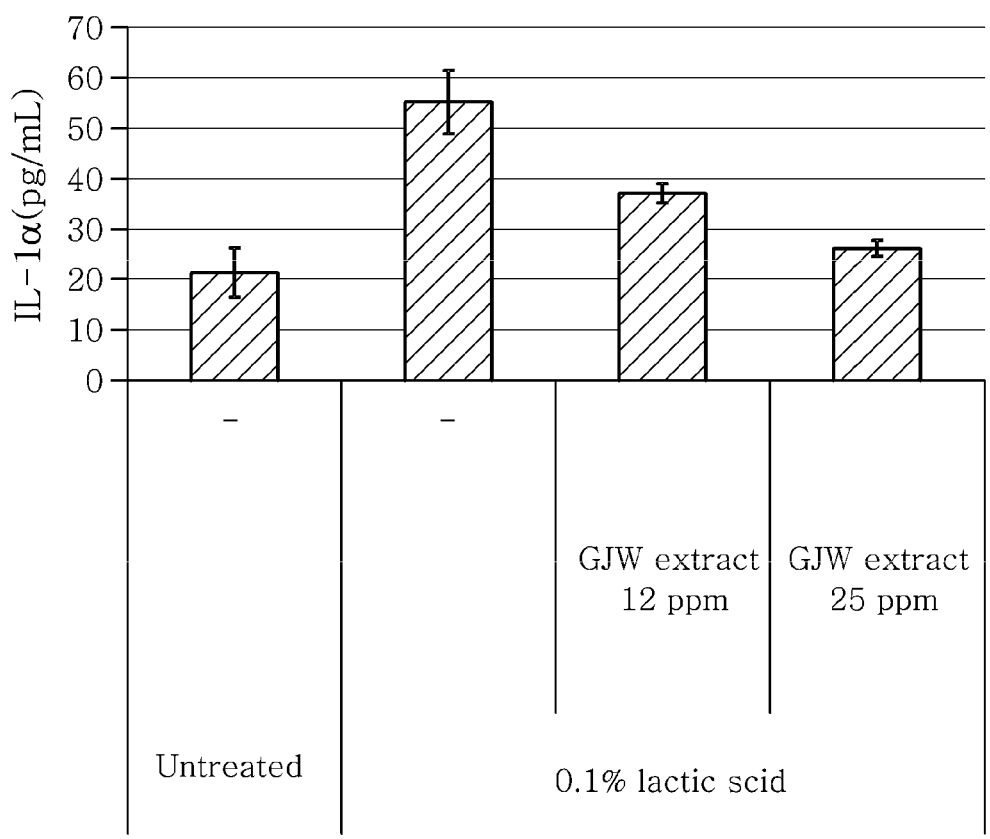
FIG. 3 shows a result of investigating the skin-soothing effect of an extract of a cultured fluid of *Aureobasidium pullulans* in a test example of the present specification.

The concentration of IL-1α is increased due to lactic acid-induced stimulation. It was confirmed that the treatment with the extract of the culture fluid of the *Aureobasidium pullulans* strain had skin-soothing effect since it relieved the lactic acid-induced stimulation (see FIG. 3).

Hereinafter, formulation examples of the composition according to the present disclosure will be described. However, it can be applied to other various formulations and the formulation examples are not intended to limit the scope of the present disclosure.

Formulation Example 1. Softening Lotion

A softening lotion was prepared according to a common method by mixing 0.01 wt % of the *Aureobasidium pullulans* culture fluid of Example 2, 3 wt % of glycerin, 2 wt % of butylene glycol, 2 wt % of propylene glycol, 0.1 wt % of carboxyvinyl polymer, 10 wt % of ethanol, 0.1 wt % of triethanolamine, a trace amount of an antiseptic, a trace amount of a pigment, a trace amount of a flavorant, and purified water as the balance.

Formulation Example 2. Nourishing Lotion

A nourishing lotion was prepared according to a common method by mixing 0.01 wt % of the *Aureobasidium pullulans* culture fluid of Example 2, 4 wt % of beeswax, 1.5 wt % of polysorbate 60, 0.5 wt % of sorbitan sesquioleate, 5 wt % of liquid paraffin, 5 wt % of squalane, 5 wt % of caprylic/capric triglyceride, 3 wt % of glycerin, 3 wt % of butylene glycol, 3 wt % of propylene glycol, 0.1 wt % of carboxyvinyl polymer, 0.2 wt % of triethanolamine, a trace amount of an antiseptic, a trace amount of a pigment, a trace amount of a flavorant, and purified water as the balance.

Formulation Example 3. Nourishing Cream

A nourishing cream was prepared according to a common method by mixing 0.01 wt % of the *Aureobasidium pullulans* culture fluid of Example 2, 10 wt % of beeswax, 1.5 wt % of polysorbate 60, 0.5 wt % of sorbitan sesquioleate, 10 wt % of liquid paraffin, 5 wt % of squalane, 5 wt % of caprylic/capric triglyceride, 5 wt % of glycerin, 3 wt % of butylene glycol, 3 wt % of propylene glycol, 0.2 wt % of triethanolamine, a trace amount of an antiseptic, a trace amount of a pigment, a trace amount of a flavorant, and purified water as the balance.

Formulation Example 4. Pack

A pack was prepared according to a common method by mixing 0.01 wt % of the *Aureobasidium pullulans* culture fluid of Example 2, 13 wt % of polyvinyl alcohol, 0.2 wt % of sodium carboxymethyl cellulose, 0.1 wt % of allantoin, 5 wt % of ethanol, 0.3 wt % of nonyl phenyl ether, a trace amount of an antiseptic, a trace amount of a pigment, a trace amount of a flavorant, and purified water as the balance.

Formulation Example 5. Medication for Topical Administration (Patch)

A medication for topical administration (patch) was prepared according to a common method with the composition described in Table 8.

TABLE 8

| Ingredients | Contents (wt %) |
|---|---|
| *Aureobasidium pullulans* culture fluid of Example 2 | 2.0 |
| β-1,3-glucan | 3.0 |
| Diethylamine | 0.7 |
| Sodium sulfite | 0.1 |
| Polyoxyethylene lauryl ether (E.O = 9) | 1.0 |
| Polyhydroxyethylene cetyl stearyl ether (Cetomacrogol 1000) | 1.0 |
| Viscous paraffin oil | 2.5 |
| Caprylic/capric ester (Cetiol LC) | 2.5 |
| Polyethylene glycol 400 | 3.0 |
| Polyacrylic acid (Carbopol 934P) | 1.0 |
| Purified water | Balance |
| Total | 100 |

Formulation Example 6. Powder

A powder was prepared by mixing 2 g of the *Aureobasidium pullulans* culture fluid of Example 2 and 1 g of lactose and filling the mixture in an airtight pouch.

Formulation Example 7. Tablet

A tablet was prepared according to a common method after mixing 100 mg of the *Aureobasidium pullulans* culture fluid of Example 2, 100 mg of corn starch, 100 mg of lactose and 2 mg of magnesium stearate.

Formulation Example 8. Capsule

A capsule was prepared according to a common method by mixing 100 mg of the *Aureobasidium pullulans* culture fluid of Example 2, 100 mg of corn starch, 100 mg of lactose and 2 mg of magnesium stearate and filling the mixture in a gelatin capsule.

Formulation Example 9. Pill

A pill weighing 4 g was prepared according to a common method by mixing 1 g of the *Aureobasidium pullulans* culture fluid of Example 2, 1.5 g of lactose, 1 g of glycerin and 0.5 g of xylitol.

Formulation Example 10. Granule

A granule was prepared according to a common method by mixing 150 g of the *Aureobasidium pullulans* culture fluid of Example 2, 50 mg of soybean extract, 200 mg of glucose and 600 mg of starch, adding 100 mg of 30% ethanol and drying the mixture at 60° C. The prepared granule was filled in a pouch.

Formulation Example 11. Drink

After mixing 50 mg of the *Aureobasidium pullulans* culture fluid of Example 2, 10 g of glucose, 0.6 g of citric acid and 25 g of oligosaccharide syrup and adding 300 mL of purified water, 200 mL of the mixture was filled in a bottle. Then, a drink was prepared by sterilizing at 130° C. for 4-5 seconds.

Formulation Example 12. Caramel

A caramel was prepared by mixing 50 mg of the *Aureobasidium pullulans* culture fluid of Example 2, 1.8 g of corn syrup, 0.5 g of skim milk, 0.5 g of soybean lecithin, 0.6 g of butter, 0.4 g of hydrogenated vegetable oil, 1.4 g of sugar, 0.58 g of margarine and 20 mg of table salt.

While the specific exemplary embodiments of the present disclosure have been described in detail, it will be apparent to those having ordinary skill in the art that they are merely specific exemplary embodiments and the scope of the present disclosure is not limited by them. Accordingly, it is to be understood that the substantial scope of the present disclosure is defined by the appended claims and their equivalents.

[Depositor]

Depositary authority: Korean Culture Center of Microorganisms

Accession number: KCCM12142P

Date of accession: Oct. 31, 2017

The invention claimed is:

1. A method for relieving skin irritation caused by an α-hydroxy acid comprising:
applying a composition to a subject in need thereof comprising an amount effective for relieving skin irritation caused by the α-hydroxy acid and regenerating the skin, the composition including an extract of a culture product of an *Aureobasidium pullulans* strain, wherein the method relieves the skin irritation caused by the α-hydroxy acid by inhibiting an increase in an IL-1α concentration by the α-hydroxy acid, the strain of the culture product is *Aureobasidium pullulans* GJW with the accession number KCCM12142P, and wherein the extract of the culture product is an ethanol fraction of a culture fluid.

2. The method according to claim 1, wherein the strain has 18S rDNA represented by a sequence of SEQ ID NO: 1.

3. The method according to claim 1, wherein the method promotes skin wound healing or relieves scar formation.

4. The method according to claim 1, wherein the α-hydroxy acid is one or more selected from a group consisting of lactic acid, malic acid, tartaric acid, citric acid and glycolic acid.

5. The method according to claim 1, wherein the composition is a cosmetic composition.

* * * * *

SEQUENCE LISTING

```
<160> NUMBER OF SEQ ID NOS: 3

<210> SEQ ID NO 1
<211> LENGTH: 574
<212> TYPE: DNA
<213> ORGANISM: Unknown
<220> FEATURE:
<223> OTHER INFORMATION: Aureobasidium pullulans GJW

<400> SEQUENCE: 1
ggggactgcg gaggatcatt aagagtaagg gtgctcagcg cccgacctcc aacccttttgt      60 tgttaaaact accttgttgc tttggcggga ccgctcggtc tcgagccgct ggggattcgt     120
cccaggcgag cgcccgccag agttaaacca aactcttgtt attaaaccgg tcgtctgagt     180
taaaattttg aataaatcaa aactttcaac aacggatctc ttggttctcg catcgatgaa     240
gaacgcagcg aaatgcgata agtaatgtga attgcagaat tcagtgaatc atcgaatctt     300
tgaacgcaca ttgcgcccct tggtattccg aggggcatgc ctgttcgagc gtcattacac     360
cactcaagct atgcttggta ttgggtgccg tccttagttg ggcgcgcctt aaagacctcg     420
gcgaggcctc accggcttta ggcgtattag aatttattcg aacgtctgtc aaaggagagg     480
acttctgccg actgaaacct tttattttttc taggttgacc tcggatcagg tagggatacc     540
cgctgaactt aagcatatca ataaggcgga ggaa                                574

<210> SEQ ID NO 2
<211> LENGTH: 19
<212> TYPE: DNA
<213> ORGANISM: Artificial Sequence
<220> FEATURE:
<223> OTHER INFORMATION: ITS1 primer

<400> SEQUENCE: 2
tccgtaggtg aacctgcgg                                                  19
```

```
<210> SEQ ID NO 3
<211> LENGTH: 20
<212> TYPE: DNA
<213> ORGANISM: Artificial Sequence
<220> FEATURE:
<223> OTHER INFORMATION: ITS4 primer

<400> SEQUENCE: 3
tcctccgctt attgatatgc                                              20
```